(12) United States Patent
Yoshida

(10) Patent No.: US 7,864,362 B2
(45) Date of Patent: Jan. 4, 2011

(54) COLOR IMAGE AND MONOCHROME IMAGE IMAGING PROCESS

(75) Inventor: Seishin Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 892 days.

(21) Appl. No.: 10/590,572

(22) PCT Filed: Aug. 4, 2005

(86) PCT No.: PCT/JP2005/014714

§ 371 (c)(1),
(2), (4) Date: Aug. 22, 2006

(87) PCT Pub. No.: WO2006/025202

PCT Pub. Date: Mar. 9, 2006

(65) Prior Publication Data

US 2007/0171440 A1    Jul. 26, 2007

(30) Foreign Application Priority Data

Aug. 31, 2004    (JP)    ............................. 2004-252294

(51) Int. Cl.
*H04N 1/60*    (2006.01)
*G03F 3/08*    (2006.01)

(52) U.S. Cl. ........................................ 358/1.9; 358/518

(58) Field of Classification Search .................. 358/1.9, 358/2.1, 1.1, 1.2, 1.6, 2.99, 3.01, 3.02, 3.1, 358/3.11, 3.12, 3.2, 3.21, 3.22, 3.23, 3.24, 358/3.26, 3.27, 1.11, 500, 501, 515, 516, 358/517, 518, 519, 520, 521, 523, 524, 526, 358/527, 528, 530; 382/162, 163, 164, 165, 382/166, 167; 399/39, 54, 112, 184, 183, 399/298, 321, 344; 347/115, 172, 232

See application file for complete search history.

(56) References Cited

U.S. PATENT DOCUMENTS 6,015,207 A    1/2000    Winter et al.

(Continued)

FOREIGN PATENT DOCUMENTS

JP    05-323750    12/1993

(Continued)

OTHER PUBLICATIONS

E. Endo, "Adobe Photoshop A to Z," 1$^{st}$ Ed., BNN, Feb. 1993, pp. 156-178 (with English translation).

(Continued)

*Primary Examiner*—Dov Popovici
(74) *Attorney, Agent, or Firm*—Martine Penilla & Gencarella, LLP

(57) ABSTRACT

The following processes are performed when generating new image data by modifying the color tones of images in image data: First the user is allowed to select a parameter from a plurality of modification candidate parameters corresponding to mutually differing modification details; then, according to the selected parameter, modified image data in which the colors of at least a portion of the pixels differ from those in the subject image data, is generated. Note that when the subject image data is color image data, then the selection can be made from Nc color image modification candidate parameters, and when monochrome image data, the selection can be made from Nm (where Nm is an integer larger than Nc) monochrome image modification candidate parameters. This type of process can provide image processing that fulfill the needs of some users with the strict requirement while not complicating the operations performed by typical users.

19 Claims, 10 Drawing Sheets

U.S. PATENT DOCUMENTS

| | | | |
|---|---|---|---|
| 6,040,927 | A | 3/2000 | Winter et al. |
| 2003/0095269 | A1* | 5/2003 | Kubo et al. ................... 358/1.9 |
| 2005/0219618 | A1* | 10/2005 | Shimada ..................... 358/2.1 |

FOREIGN PATENT DOCUMENTS

| | | |
|---|---|---|
| JP | 07-236067 | 9/1995 |
| JP | 08-214164 | 8/1996 |
| JP | 09-146721 | 6/1997 |
| JP | 10-004494 | 1/1998 |
| JP | 11-355584 | 12/1999 |
| JP | 2000-078406 | 3/2000 |
| JP | 2001-346054 | 12/2001 |
| JP | 2002-125130 | 4/2002 |

OTHER PUBLICATIONS

Abstract of Japanese Patent Publication No. 05-323750, Pub. Date: Dec. 7, 1993, Patent Abstracts of Japan.

Abstract of Japanese Patent Publication No. 07-236067, Pub. Date: Sep. 5, 1995, Patent Abstracts of Japan.

Abstract of Japanese Patent Publication No. 08-214164, Pub. Date: Aug. 20, 1996, Patent Abstracts of Japan.

Abstract of Japanese Patent Publication No. 09-146721, Pub. Date: Jun. 6, 1997, Patent Abstracts of Japan.

Abstract of Japanese Patent Publication No. 10-004494, Pub. Date: Jan. 6, 1998, Patent Abstracts of Japan.

Abstract of Japanese Patent Publication No. 11-355584, Pub. Date: Dec. 24, 1999, Patent Abstracts of Japan.

Abstract of Japanese Patent Publication No. 2001-346054, Pub. Date: Dec. 14, 2001, Patent Abstracts of Japan.

Abstract of Japanese Patent Publication No. 2000-078406, Pub. Date: Mar. 14, 2000, Patent Abstracts of Japan.

Abstract of Japanese Patent Publication No. 2002-125130, Pub. Date: Apr. 26, 2002, Patent Abstracts of Japan.

* cited by examiner

US 7,864,362 B2

COLOR IMAGE AND MONOCHROME IMAGE IMAGING PROCESS

TECHNICAL FIELD

The present invention relates to technologies for adjusting the color tone of images in image data.

BACKGROUND ART

Conventionally, there has been application software capable of adjusting the color tones of images in image data and, when necessary, printing the images. Specifically, in adjusting the color tones, the tone values of the colors in the pixels within the images are modified. In JP-A 8-214164 and JP-A 5-323750, the tone values of the pixels are converted according to a specific tone curve that specifies the relationships between input tone values and output tone values.

For users, such as conventional silver halide photography enthusiasts, who use monochrome image data and desire fine adjustments in image quality of monochrome images, image processing systems enabling these fine tone adjustments are preferable; however, image processing systems wherein fine tone adjustments are possible are complicated in terms of both the operating screens, and in terms of the operations as well. For the typical user, who does not wish to go so far as to perform fine adjustments in color tone, the use of such image processing systems is too complicated.

The present invention is the result of contemplation of this point, and the object thereof is to provide image processing means that fulfill the strict requirements of some users who perform processing on monochrome images, without complicating the operations performed by typical users.

Note that the disclosure in JP-A 2004-252294 is incorporated herein for reference.

SUMMARY OF THE INVENTION

To address, at least in part, the issue described above, in the present invention the following processes are performed when producing new image data through modifying the color tones of images of image data. First, a user is allowed to select a parameter from a plurality of modification candidate parameters for modifying colors of pixels in image data; The plurality of modification candidate parameters correspond to mutually differing modifications; Then modified image data is generated according to the selected parameter from subject image data that is a subject for modifications of color tones in image; The modified image data is different from the subject image data in colors of at least part of pixels.

The plurality of modification candidate parameters includes: Nc (where Nc is a positive integer) color image modification candidate parameters for color image data; and Nm (where Nm is an integer that is larger than Nc) monochrome image modification candidate parameters for monochrome images. Note that the color image modification candidate parameters and the monochrome image modification candidate parameters may, in part, overlap.

When the applicable image data is color image data, the user may select, for example, one parameter from Nc color image modification candidate parameters. When the applicable image data is monochrome image data, the user may select, for example, one parameter from among the Nm monochrome image modification candidate parameters. In this arrangement, it is possible to select the details of the color modification from among more candidates for monochrome images than it is for color images. As a result, the needs of the users with strict requirement, who print monochrome images, are fulfilled without complicating the operation for the typical users.

Tt is preferable that the plurality of modification candidate parameters are parameters that express characteristics of tone conversion. For example, the plurality of modification candidate parameters can be parameters corresponding to modifications that convert the tone values in a specific system of tone values into tone values in the same system of tone values. The specific system of tone values may be, for example, a system of tone values that group together a plurality of colors with different intensities. The plurality of modification-candidate parameters may each, for example, select tone values from among the 0 to 255 tone values that indicate achromatic tones from black through white and convert to any one of the tone values from 0 to 255, which indicate, similarly, achromatic tones. This conversion may be a conversion that converts, for example, only those tone values 1 to 32 (out of the tone values 0 to 255), into other different values respectively.

Preferably the processing is performed as in the below: According to the selected parameter, a conversion curve for producing modification of colors of pixels is prepared; The conversion curve provides output tone values corresponding to input tone values; When the subject image data is monochrome image data, a user is provided a partial adjustment input screen for modifying a second part of the conversion curve without modifying a first part of the conversion curve, when the subject image data is monochrome image data; The first part is a part in which the input tone values are within a specific range; On the other hand, the configuration may be one wherein the partial tone adjustment input screen is not provided to the users when the applicable image data is color image data; The second part of the conversion curve is modified according to user instructions through the partial adjustment input screen; Tone values of pixels of the subject image data are modified based on the conversion curve. This configuration enables the user to specify modifications in tone in greater detail when processing monochrome images than when processing color images.

It is preferable that the second part is a part corresponding to an area of the input tone values. The area is preferably included in a range of up to top 40% of scope of the input tone values. Whereas it is also preferable that the area is included in a range of up to bottom 25% of scope of the input tone values.

It is preferable that, in the modification of the second part, the second part is modified so that change in the output tone value of the conversion curve is within a range of ±10 when expressed as the "L*" in an "L*a*b*" color coordinate system. This configuration enables the prevention of the image from becoming unnatural due to the modifications.

Preferably the processing is performed as in the below: According to the information about the type of the print medium, an allowable range of modifications of the output tone values of the conversion curve by the conversion curve modifying portion is determined; In the modification of the second part, the conversion curve is modified so that sizes of the changes in the output tone values of the conversion curve are within the allowable range. This configuration enables the modification of the tones in images so as to express images in a narrow range of tone values in printed media wherein the expression of dark tones and bright tones is difficult.

In the modification of the second part of the conversion curve, it is preferable that the tone values are converted so that a highest value in scope of the input tone values is converted into a lower value than a highest value in scope of the output tone values. This type of modification adds a color, with a brightness not exceeding a specific value, in all areas of the image. This enables the area outside of the image to be clearly discernable when a color corresponding to the maximum value of the tone values is added in the part surrounding the image.

In the modification of the second part of the conversion curve, it is also preferable that the tone values are converted so that a lowest value of in scope of the input tone values is converted into a higher value than a lowest value in scope of the output tone values.

Moreover, when the applicable image data is monochrome image data, the performance of the processes such as shown below is desirable. A monochrome image conversion table is generated according to the conversion curve when the subject image is monochrome image data. The monochrome image conversion table is a conversion table for converting the monochrome image data into image data expressed by tone values in a specific first color coordinate system. The conversion with the monochrome image conversion table converts at least a part of achromatic colors expressed by tone values into colors with different brightnesses. The subject image data is converted into the modified image data based on the monochrome image conversion table when the subject image data is monochrome image data. This type of configuration enables the modification of image data according to a conversion curve by modifying a conversion table.

Note that when a monochrome image conversion table is generated according to a conversion curve, it is desirable to generate the monochrome image conversion table by modifying, according to the conversion curve, a reference monochrome image conversion table that is prepared in advance. The reference monochrome image conversion table is preferably a conversion table that includes a part in which, when colors are expressed in an "L*a*b*" color coordinate system, the "L*" value of a color that is modified according to the conversion curve is incremented linearly relative to increments in the input tone value that expresses color prior to modification. Conversion of the image data using this type of monochrome image conversion table enables the conversion of tones by which the differences in tones are easily discernable in the tone values in the second part described above.

Moreover, processing such as described below is desirable when the color image data is image data wherein the tone of each pixel is expressed in a color tone in a second color coordinate system. A color image conversion table is generated according to the conversion curve when the subject image data is color image data. The color image conversion table is a conversion table for converting the color image data into image data expressed by tone values in a third color coordinate system that is different from the second color coordinate system. The conversion with the color image conversion table modifies at least part of colors expressed by the tone values in the second color coordinate system into other colors.

The subject image data is converted into the modified image data based on the color image conversion table when the subject image data is color image data. The third color coordinate system is a color coordinate system in which tone values can be any of Mc (where Mc is a positive integer) mutually differing values. The first color coordinate system is a color coordinate system in which tone value can be any of Mm (where Mm is an integer larger than Mc) mutually differing values. This type of configuration enables the reproduction of finer differences in color tone for monochrome image data.

Note that the present invention can be embodied in a variety of forms, for example, can be embodied in an image data generating method and device, an image data color conversion assistance method and device, a printing control method and device, a printing method and device, a computer program for achieving the functions of these methods and devices, a computer program product, and so forth.

Preferred examples of embodiment of the invention according to the present application will be described in detail in the below in reference to the drawings, and the objects of the present invention, as described above, along with other objects, structures, and effects of the invention according to the present application, will be described below.

BEST MODE FOR CARRYING OUT THE INVENTION

A. First Embodiment

A1. Overall Structure

Figure 1:
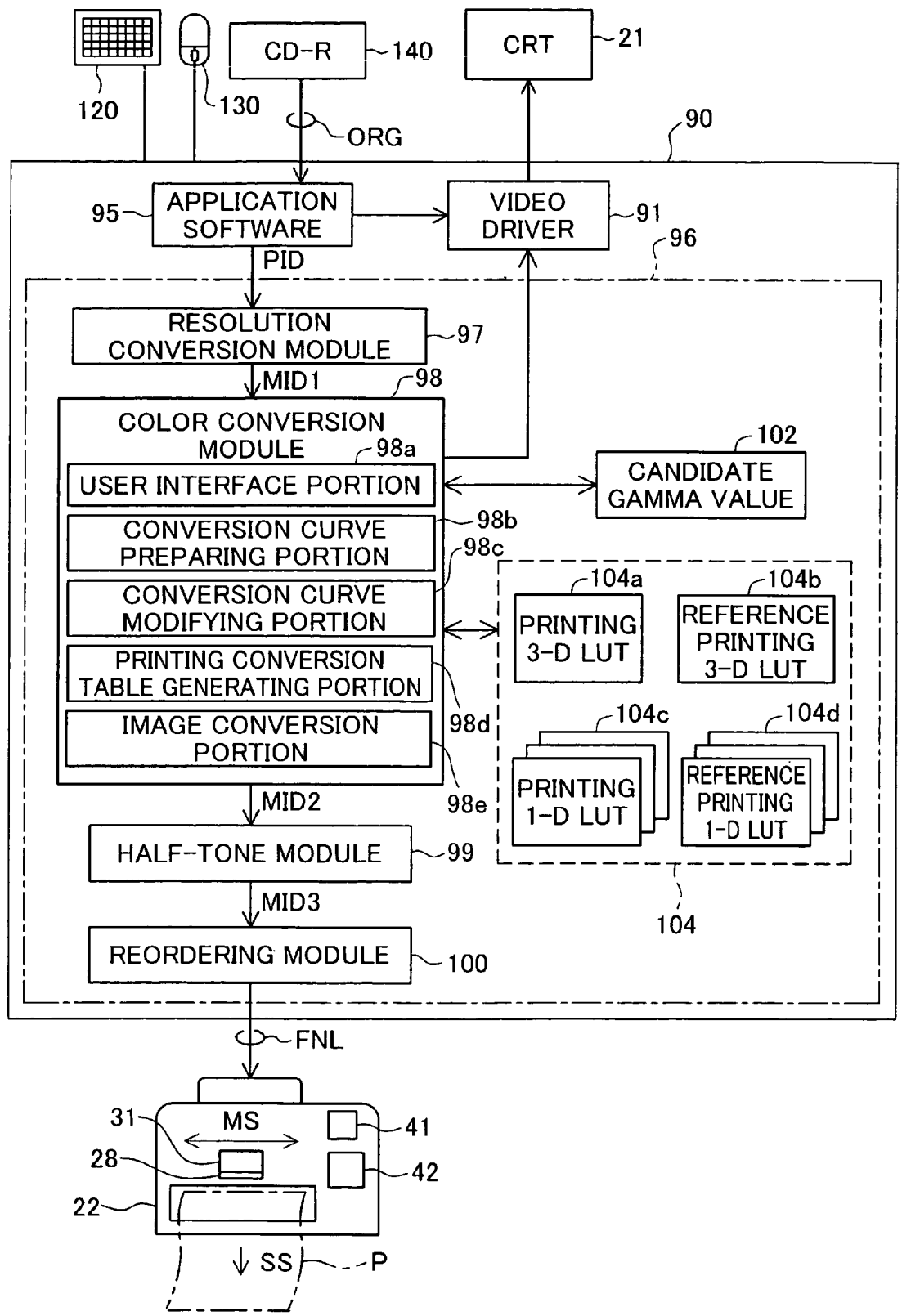
FIG. 1 is a block diagram illustrating the structure of software in a printing system according to a first embodiment.

FIG. 1 is a block diagram illustrating the structure of software in a printing system in a first embodiment. In a computer 90, an application program 95 is run under a specific operating system. A video driver 91 and a printer driver 96 are incorporated into the operating system.

An application program 95 reads in, from a CD-R 140, the original image data ORG, constituting the three color components of red (R), green (G), and blue (B), according to and instruction from the user inputted using a mouse 130 and/or keyboard 120. Note that processes, such as retouching the image in the original image data ORG, may be performed according to instructions from the user. The application program 95 displays the process image on a CRT display 21 through a video driver 91. When the application program 95 has received a print instruction from the user, a print instruction is issued to the printer driver 96, and the processed image is outputted to the printer driver 96 as preliminary image data PID. The preliminary image data PID is image data that is expressed in, for example, combinations of the three tone values for red, green, and blue, each being a value between 0 and 255, for the color of each pixel.

In the application program 95, the original image data ORG may also be converted into black and white preliminary image data PID, wherein the brightness is expressed in tone values between 0 and 255. Moreover, the original image data ORG itself may be this type of black-and-white image. In such a case, the preliminary image data PID will also be black-and-white image data wherein the brightness is expressed with tone values from 0 to 255.

The printer driver 96 receives the preliminary image data PID from the application program 95. The printer driver 96 converts this preliminary image data PID into print image data FNL that can be processed by a printer 22 (where this data is a signal wherein multivaluation has been performed for six colors of inks: cyan, magenta, yellow, and achromatic inks 1 through 3). Note that the achromatic inks 1 through 3 are achromatic inks of sequentially higher brightness values, in that order.

In the example shown in FIG. 1, the printer driver 96 is provided with a resolution conversion module 97, a color conversion module 98, a candidate gamma value storage portion 102, a color conversion table 104, a half-tone module 99, and a reordering module 100.

The resolution conversion module 97 converts the resolution of the preliminary image data PID into the resolution to be printed by the printer 22. The color conversion module 98 references a printing three-dimensional lookup table 104a, of the color conversion table 104, to convert the image data MID1, wherein the colors of each pixel are expressed in RGB tone values, into the image data MID2, wherein the colors of each pixel are expressed in tone values used by the printer 22: cyan (C), magenta (M), yellow (Y), and the first through third achromatic inks (K1 through K3). The color conversion module 98 also references a printing one-dimensional lookup table 104c, of the color conversion table 104, to convert the black-and-white image data MID1 into the image data MID2, wherein the color of each pixel is expressed in the tone values for cyan (C), magenta (M), yellow (Y) and the first through third achromatic inks (K1 through K3).

Note that when the preliminary image data PID is a black-and-white image, a specific color tone may be applied thereto for printing. The case wherein a specific color tone is added to a black-and-white image for printing is explained in the second embodiment.

The half-tone module 99 performs a half-tone process on the image data MID2, wherein the densities of each color in each pixel are expressed by the tone values for each color, to convert into the image data MID3 (the image data MID3 may be as "print data" or "dot data"), where the density of each color is expressed in terms of whether or not there is a dot in each pixel.

The image data MID3, produced in this way, is reordered, by the reordering module 100, into the data sequence to be sent to the printer 22, and is finally outputted as the print image data FNL.

The printer 22 comprises: a mechanism for feeding a paper P by a paper feed motor; a mechanism for driving, by a carriage motor, a carriage 31 reciprocatingly in the direction MS perpendicular to the direction SS for feeding the paper P; a print head 28, mounted on the carriage 31, for ejecting ink and forming dots; a PROM 42 for storing various types of setting data; and a CPU 41 for controlling the paper feed motor and the carriage motor, the print head 28, the PROM 42, and an operating panel 32. The printer 22 receives the print image data FNL and performs the printing by forming dots, on the print medium, by cyan (C), magenta (M), yellow (Y), and the first through third achromatic inks (K1 to K3) according to this print image data FNL.

Note that in this specification, "printing device" refers to the printer 22 alone in a narrow sense, and, in a broad sense, indicates the entire printing system including the computer 90 and the printer 22.

A2. Black-and-White Image Tone Value Conversion

First, printing will be explained for the case wherein the preliminary image data PID is black-and-white image data wherein the color of each pixel is expressed by a tone value between 0 and 255, which indicates the brightness. Here a density adjustment is first performed on the black-and-white image of the preliminary image data PID, after which printing is performed. Note that in this specification "color" includes not only chromatic colors, but also achromatic colors. Grays with different densities are "different colors."

Figure 2:
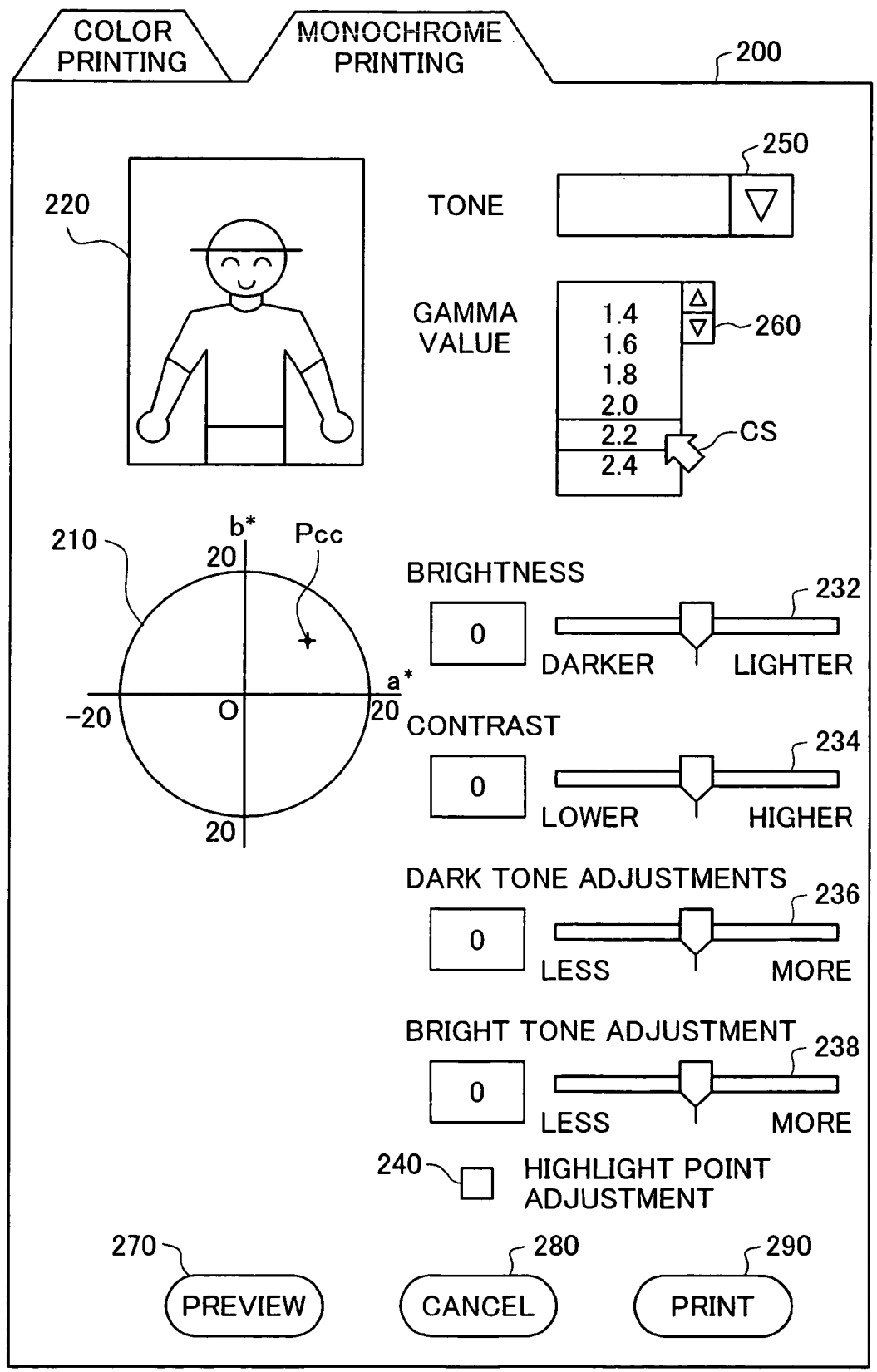
FIG. 2 is an explanatory diagram illustrating a color tone settings screen 200 in a printer driver 96.

FIG. 2 is an explanatory diagram illustrating a color tone settings screen 200 of a printer driver 96. When printing instructions are outputted from the application program 95, the user interface screen of the printer driver 96 is displayed on the CRT display 21. When the user selects the monochrome printing tab (in the upper left of FIG. 2) in the user interface screen of the printer driver 96, the color tone settings screen 200 shown in FIG. 2 will be displayed on the screen of the CRT 21.

The color tone settings screen 200 includes: a gamma value specifying portion 260 for specifying the gamma value when performing gamma correction; a color circle 210 for specifying the tone to add to the black-and-white image: a color tone selecting part 250 for selecting, from among color tones that have been provided in advance, the setting for the color tone to be added to the black-and-white image; and a sample image display area 220 for displaying a color sample image.

Note that in the first embodiment, the explanation will be of the case wherein the black-and-white image will be printed as is, without applying a color tone. Because of this, the color circle 210 and the color tone selecting part 250 will not be used. Consequently, explanations thereof will be omitted. The case wherein a color tone is applied to the black-and-white image for printing will be explained in the second embodiment.

The color tone settings screen 200 also includes: a brightness scale 232 for specifying the brightness parameter that sets the brightness of the image; a contrast scale 234 for specifying the contrast parameter that sets the contract of the image; a dark tone adjusting scale 236 for adjusting the density of the relatively dark pixels with tone values between 0 and 32; and a bright tone adjusting scale 238 for adjusting the density of the pixels that are relatively bright, with tone values between 192 and 255. The color tone settings screen 200 also has a highlight point checkbox for adjusting the brightness of the brightest colors in the image data.

The color tone settings screen 200 further has a preview button 270 for displaying in the sample image display area 220 a color sample image when the image has been converted into the preliminary image data PID through color tone adjustments specified through the aforementioned gamma value specifying portion 260 and the various scales 232 to 238. There is also a cancel button 280 for canceling the print process, and a print button 290 for causing the image to be converted according to the parameters, after the parameters that have been set have been confirmed, and for causing the printing to proceed.

The user can move a cursor CS using a mouse 130 to specify a gamma value in the gamma value specifying portion 260 of the color tone settings screen 200. When printing a black-and-white image, six gamma value candidates, ranging from 1.4 to 2.4 at intervals of 0.2, are prepared in advance in the candidate gamma value storage portion 102. When the user clicks the gamma value specifying portion 260, the candidates for the gamma values are provided to the color tone settings screen 200, as shown in FIG. 2. The user specifies one of these gamma values using the mouse 130. Note that if the user does not specify any gamma value in the gamma value specifying portion 260, then the gamma value will be set to the default value of 1.8.

Figure 3:
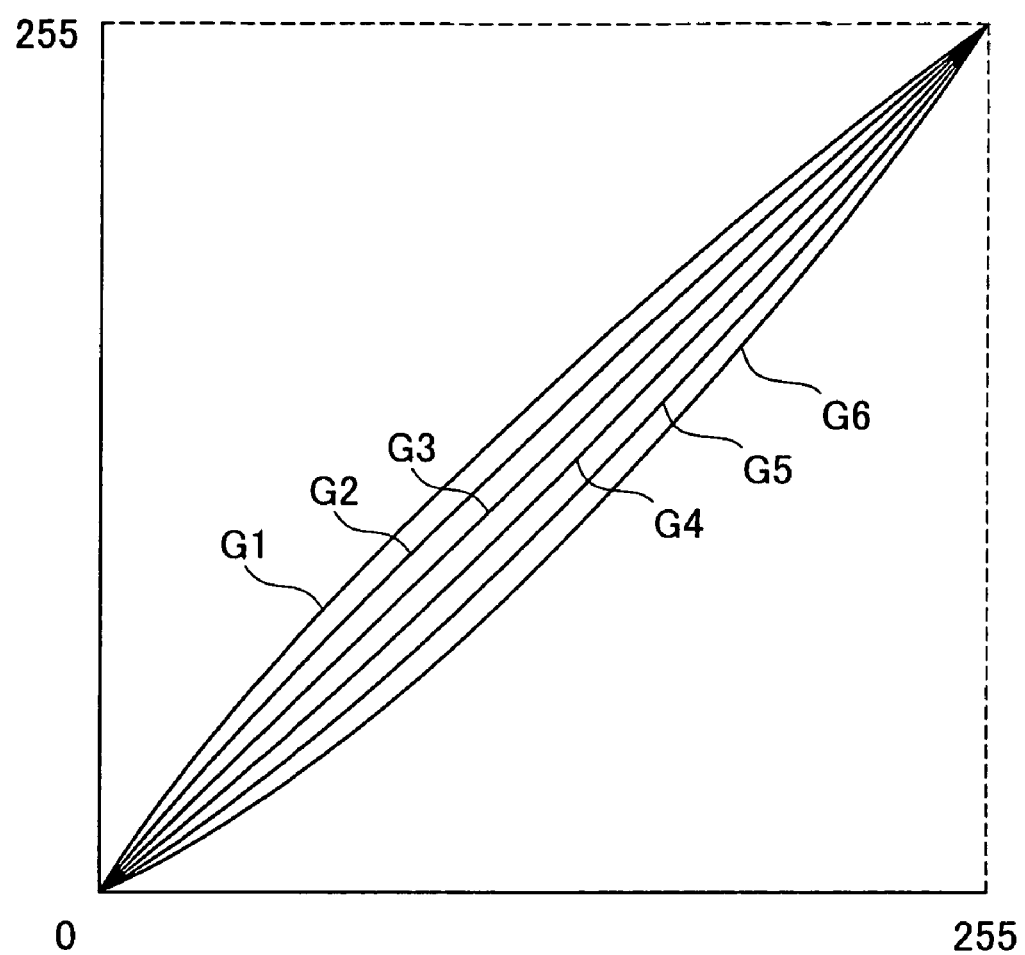
FIG. 3 is a diagram illustrating a tone curve corresponding to each gamma value between 1.4 and 2.4.

FIG. 3 is a figure showing the tone curves corresponding to the gamma values of 1.4 to 2.4. In FIG. 3, the horizontal axis is the input tone value and the vertical axis is the output tone value. The six gamma values between 1.4 and 2.4 correspond, respectively, to the tone curve G1 through G6. Note that the tone curve G3 corresponding to a gamma value of 1.8 is a straight line. That is, the gamma value for the inputted image data can be envisioned to be 1.8. Consequently, if the gamma value specified by the user is 1.8, then the tone values are not changed. Each of the input tone values between 0 and 255 are changed into the corresponding output tone values according to these tone curves. The user selecting a gamma value in the gamma value specifying portion 260 essentially selects the way in which the tone values will be changed.

Moreover, the user, by operating the brightness scale 232 and the contrast scale 234 can determine the overall shape of the tone curve that specifies the way in which the tone values will be converted. For example, when the brightness scale 232 is moved to the right, the tone curve will remain stationary on both ends, or in other words the output tone values will remain the same for the input tone values of 0 and 255, but will rise further the closer to the center of the curve. When the brightness scale 232 is moved to the left, the opposite is true, where the tone curve is moved further downward the closer towards the center. When the contrast scale 234 is moved to the right, the output tone values remain the same for the input tone values of 0 and 255, where the curve is moved upward for the tone values greater than 128, and moved downward for the input tone values in the area less than 128. The opposite is true when the contrast scale 234 is moved to the left.

Note that in some cases more than one of these gamma value specifying portion 260, brightness scale 232, and contrast scale 234 may be used. In such cases, the operations are superimposed on each other to determine the overall shape of the tone curve.

Figure 4A:
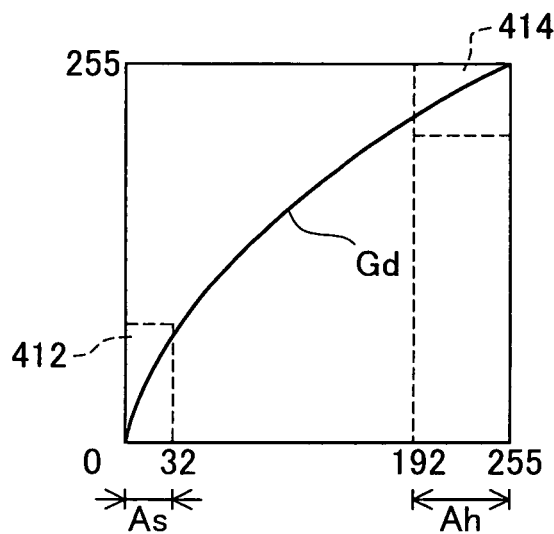
FIG. 4 is an explanatory diagram illustrating the details of a correction to a tone curve through a dark tone adjustment scale 236 and a bright tone adjustment scale 238.
Figure 4B:
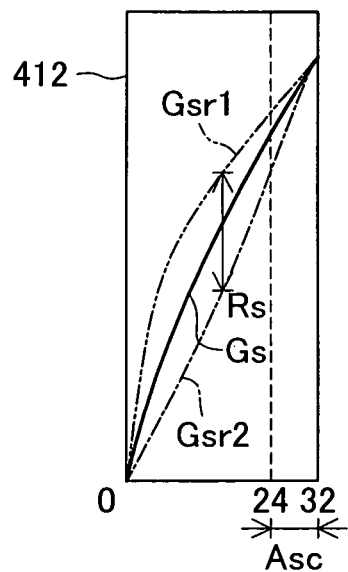
Figure 4C:
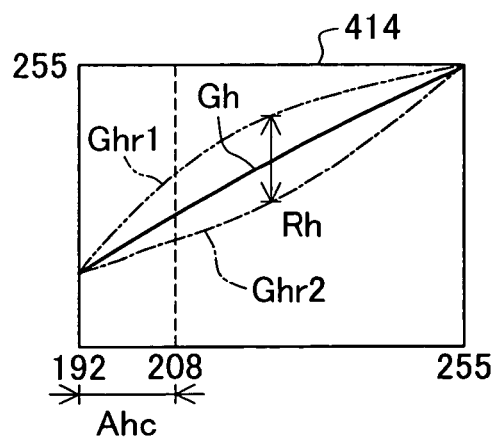

FIGS. 4A to 4C illustrate the details of the corrections to the tone curve through the dark tone adjustment scale 236 and the bright tone adjustment scale 238. FIG. 4A illustrates the entirety of a tone curve Gd that is specified by the gamma value specifying portion 260, the brightness scale 232, and the contrast scale 234. FIG. 4B is a magnified view of the part Gs in the bright area As wherein the input tone values are 0 to 32, a part of the tone curve Gd that is shown in FIG. 4A. The area in FIG. 4A corresponding to the area 412 shown in FIG. 4B is indicated by the dotted line.

The user can use the dark tone adjustment scale 236 (shown in FIG. 2) to determine the shape of the part of the tone curve Gs that is in the dark area As wherein the tone values are between 0 and 32. When the dark tone adjustment scale 236 is moved to the right, the part tone curve Gs is moved upward, as is shown as the curve Gsr1 in FIG. 4B. Conversely, when the dark tone adjustment scale 236 is moved to the left, the part tone curve Gs is moved downward, as shown as the curve Gsr2 in FIG. 4B. In either case, the change in shape is performed while maintaining the states of the output tone values on both ends of the dark area As, or in other words, without changing the output tone values when the input tone values are 0 or 32. The curve for the part tone curve Gs in the dark area As may be a quadratic curve.

FIG. 4C is a close-up view of the part Gh of the tone curve Gd, which is shown in FIG. 4A, that is in the bright area Ah, wherein the input tone values are between 192 and 255. The area corresponding to the area 414 shown in FIG. 4C is shown by the dotted line in FIG. 4A.

The user can move the bright tone adjustment scale 238 to determine the shape of the part tone curve Gh in the bright area Ah, wherein the tone values are between 192 and 255. When the bright tone adjustment scale 238 is moved to the right, the part tone curve Gh is moved upwards, as shown as the curve Ghr1 in FIG. 4C. Conversely, when the bright tone adjustment scale 238 is moved to the left, the part tone curve Gh is moved downward, as shown as the curve Ghr2 in FIG. 4C. In either case, the change in shape is performed while maintaining the states of the output tone values on both ends of the bright area Ah, or in other words, without changing the output tone values when the input tone values are 192 or 255. The curve for the part tone curve Gh in the bright area Ah may be a quadratic curve.

Change amounts Rs and Rh are set so that these changes in shapes of the tone curves in the dark area As and the bright area Ah will have a change in brightness of no more that +/−10 at the point wherein the output tone value changes the most. Note that here the "brightness" is the value of the "L*" in an "L*a*b*" color coordinate system In a monochrome image, the reproducibility of the color tones in the bright parts and the dark parts is more important than in a color image. Adjusting the tone curves in the dark area As and in the bright area Ah enables fine adjustments to the tone values in the bright parts and dark parts following the tone curves.

Figure 5:
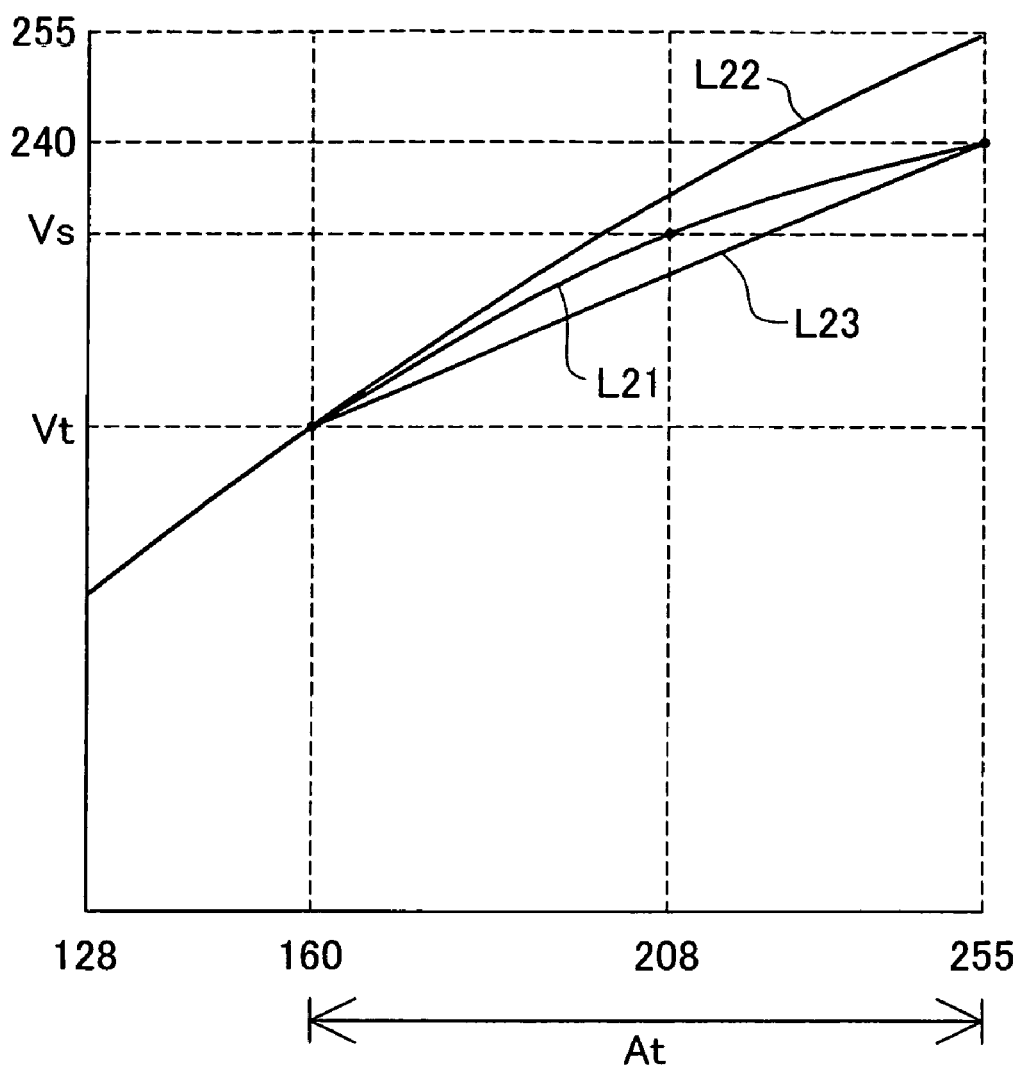
FIG. 5 is a diagram illustrating a tone curve in a transition area with input tone values on and above 128.

FIG. 5 is a diagram showing a tone curve in an area wherein the input tone values are 128 and above. The user can check the highlight point checkbox 240 (shown in FIG. 2) to cause the output tone value for an input tone value of 255 to be 240 instead of 255 in the tone curve. When the highlight point checkbox 240 is checked, then the tone curve smoothly changes shape towards the point (255, 240) in the transition area At wherein the input tone values are 160 and above.

In FIG. 5, the tone curve that is changed by the highlight point checkbox 240 being checked is shown as the tone curve L21. The tone curve prior to the highlight point checkbox 240 being checked is the tone curve L22. The line segment passing through (160, Vt) and (255, 240) is line segment L23. Here Vt is the output tone value that is determined by the tone curve L22 when the input tone value is 160. The shape of the modified tone curve L21 can be, for example, a quadratic curve passing through the points (160, Vt), (255, 240), and (208, Vs). Here Vs is a mean tone value of the output tone value determined by the tone curve L22 and the output tone value determined by the line segment L23 when the input tone value is 208.

In this way, for the brightest tone value within the image data, effects such as described below can be obtained through no having the output tone value be the maximum value. That is, even in an area wherein the brightest colors are specified within the image data, it is still possible to enable the recording of ink when printing. The result is that the following possible problem will not occur. That is, due to a lack of ink being printed on the areas with the brightest colors, the area with the brightest colors has a different feel in the printed materials from the other areas which are printed with ink.

Moreover, even when the areas for which the brightest colors are specified are at the edges of the image, it is still easy to discern how far the image extends, and where the image ends, because there will be ink recorded on all areas of the image on the print medium.

By doing the above, the user operates each of the elements in the color tone settings screen 200 to determine the tone curve Gd for modifying the tones in the black-and-white image. The color tone settings screen 200 is displayed on the CRT 21, and, in FIG. 1, the functional parts that achieve the functions of receiving instructions from the users are shown as the user interface portion 98*a*. Furthermore, the functional parts that perform the function of preparing the tone curve according to the gamma value specified by the user are shown as the conversion curve preparing portion 98*b*. The functional parts that achieve the functions of partially modifying the tone curve according to instructions from the user inputted through the dark tone adjustment scale 236, the bright tone adjustment scale 238, and the highlight point checkbox 240 are shown as the conversion curve modifying portion 98*c*.

A3. Generating the Printing One-dimensional Lookup Table

The printing conversion table generating portion 98*d* (shown in FIG. 1) which is a functional part of the color conversion module 98, generates a printing one-dimensional lookup table 104*c* based on the reference printing one-dimensional lookup table 104*d* for printing. The reference printing one-dimensional lookup table 104*d* is a lookup table that is used when printing black-and-white images using the default tones. On the other hand, the printing one-dimensional lookup table 104*c* is a lookup table that is used when printing after having modified the tones of the black-and-white image using the tone curve Gd that has been established through the color tone settings screen 200.

Figure 6:
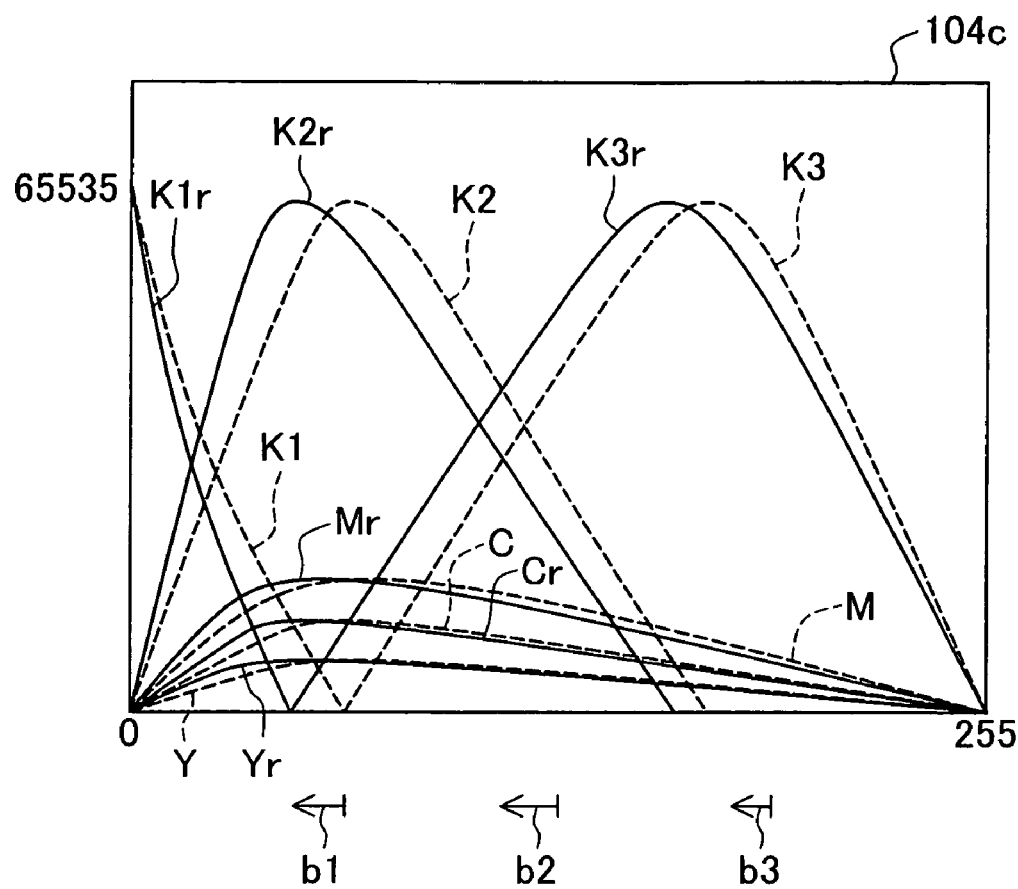
FIG. 6 is an explanatory diagram illustrating a method of producing a printing 1-dimensional lookup table 104*c*.
Figure 6:
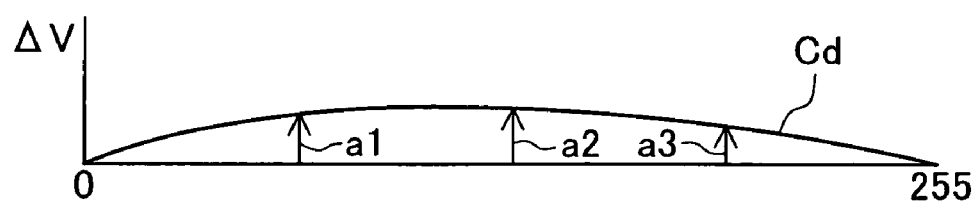

FIG. 6 is an explanatory diagram showing the method for generating the printing one-dimensional lookup table 104*c*. The horizontal axis in the graph shown at the top of FIG. 6 is the tone value that indicates the brightness. The further to the right on the horizontal axis, the brighter the brightness of the gray, and the further to the left, the darker. The preliminary image data PID (shown in FIG. 1) is black-and-white image data expressed in tone values between 0 and 255, which indicate the brightness, and the input tone values on the horizontal axis are from 0 to 255.

On the other hand, the vertical axis on the graph shown at the top of FIG. 6 shows the tone values for cyan, magenta, yellow, and the first through third achromatic inks. In contrast to the input tone values on the horizontal axis, which range from 0 to 255, the output tone values on the vertical axis range from 0 to 65,535. The tone values for the cyan, magenta, yellow, and first through third achromatic inks in the one-dimensional lookup table 104*d* for printing are indicated, respectively, by the graphs C, M, Y, K1, K2, and K3 with the dotted lines. Moreover, in the printing one-dimensional lookup table 104*c*, the tone values for the cyan, magenta, yellow and first through third achromatic inks are indicated by the graphs Cr, Mr, Yr, K1*r*, K2*r*, and K3*r*, with the solid lines, respectively.

The printing conversion table generating portion 98*d* converts the graphs for the first through third achromatic inks (K1 to K3) and for the inks for the cyan (C), magenta (M) and yellow (Y), in the reference printing one-dimensional lookup table 104*d* according to the tone curve that has been set up through the color tone settings screen 200. Through this, the printing conversion table generating portion 98*d* generates the graphs for the first through third achromatic inks (K1 to K3) and for the inks for the cyan (C), magenta (M), and yellow (Y) in the printing one-dimensional lookup table 104*c*.

The horizontal axis on the graph shown at the bottom of FIG. 6 is the input color tone for gray. Similar to the graph at the top, the further to the right on the horizontal axis, the brighter the brightness of the gray, and the further to the left, the darker. The vertical axis in the graph shown at the bottom of FIG. 6 is the increment ΔV in each of the color tone values due to the conversion according to the tone curve Gd that has been determined. This conversion converts each of the input tone values into a larger output tone value, with the exception of tone values 0 and 255. Consequently, the printing one-dimensional lookup table 104*c* to be generated is generated by modifying the reference printing one-dimensional lookup table 104*d* so as to be able to output brighter colors for the tone values that have the same brightness in the black-and-white image.

For example, we will consider the case wherein the input tone value 128 is converted to an output tone value 136 through a conversion according to the tone curve Gd. In this case, the printing one-dimensional lookup table 104*c* is converted so that the output tone value that was applied for the tone value of 136 in the reference printing one-dimensional lookup table 104*d* will be converted so as to be applied for the tone value 128. In this case, the printing one-dimensional lookup table 104*c*, as shown by the arrows b1 through b3 in the middle of FIG. 6, is converted to be skewed to the left when compared to the reference printing one-dimensional lookup table 104*d*. Note that there are no changes in the output tone values at the input tone values of 0 and 255.

The color conversion module 98 in FIG. 1 converts the black-and-white image data MID1 into image data MID2 wherein the color of each pixel is expressed in terms of tone values for the first through third achromatic inks (K1 through K3), and the tone values for the inks for cyan (C), magenta (M), and yellow (Y) according to the printing one-dimensional lookup table 104*c* that was generated in this way. The functional part that performs this type of function is indicated as the image converting portion 98*e*.

Typically, the users that print black-and-white images are users who desire fine tuning of the image quality, such as those who have conventionally been silver halide photographers. In the first embodiment, this fine tuning of image quality of black-and-white images can be performed, by this type of user, by having structures such as explained above in the first embodiment.

A4. Color Conversions of Color Images

Figure 7:
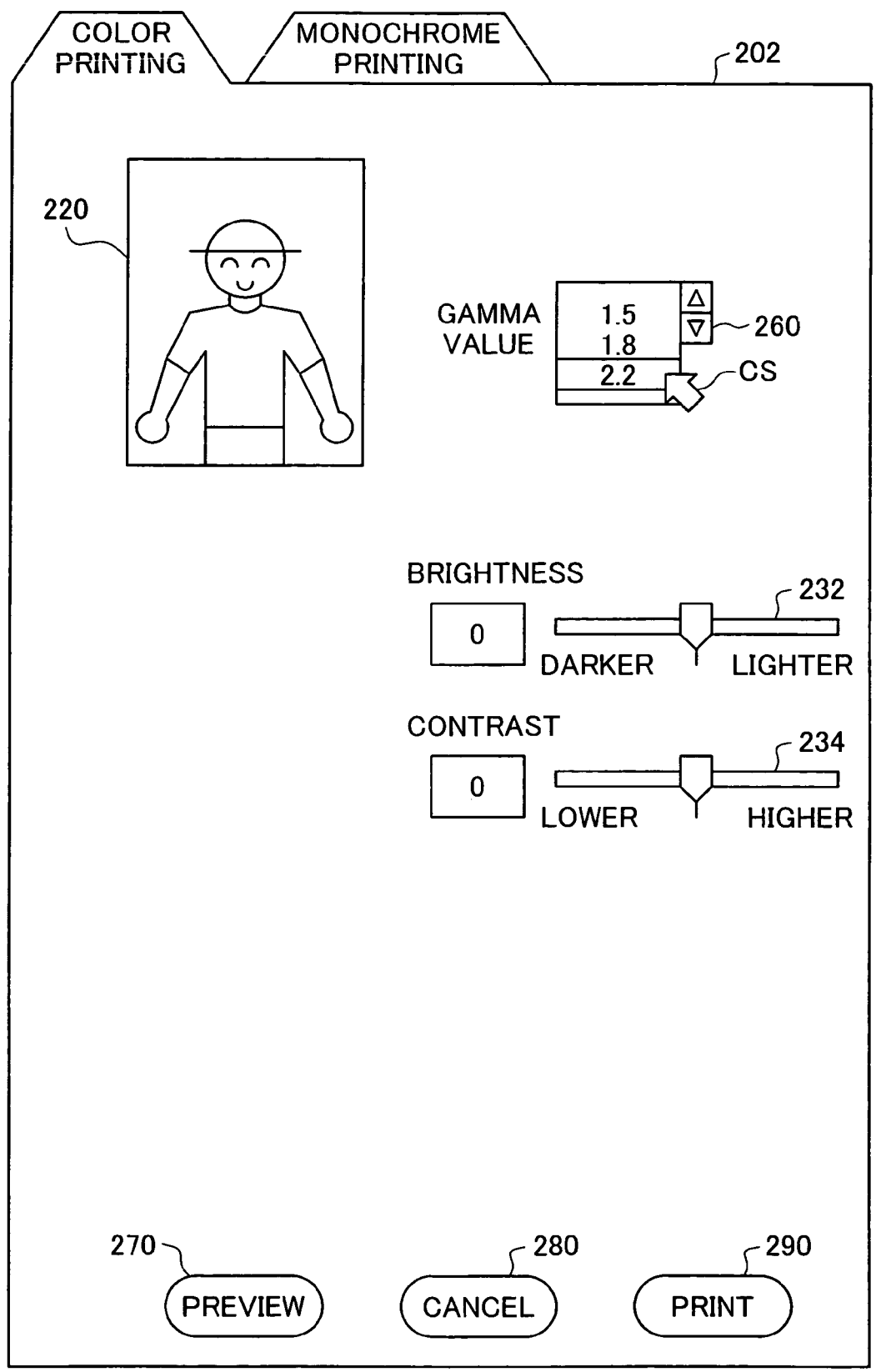
FIG. 7 is an explanatory diagram showing a tone settings screen 202 for a printer driver 96.

FIG. 7 is an explanatory diagram illustrating a color tone settings screen 202 of a printer driver 96. An explanation will be given regarding printing for the case wherein the preliminary image data PID is color image data wherein the color of each pixel is expressed by color tones ranging from 0 to 255 for red, green, and blue. The color tone settings screen of the printer driver 96 is displayed when printing, even when the preliminary image data PID is color image data. However, the dark tone adjustment scale 236, bright tone adjustment scale 238, and highlight point checkbox 240 are not provided in the color tone settings screen 222 for color images (See FIG. 2). Moreover, because the color circle 210 for specifying a color tone to be applied to the image, and the color tone selecting part 250 for selecting a color tone setting to be applied to the image from among preset color tones are both used only with black-and-white images, and so are not provided in the color tone settings screen 202 for color images. In other regards, this color tone settings screen 202 for color images is identical to the color tone settings screen 200 for monochrome images.

Even in the color tone settings screen 202 for color images the user is able to specify the shape of the tone curve through the gamma value specifying part, the brightness scale and the contrast scale, in the same manner as in the color tone settings screen 200 for black-and-white images (see FIG. 2). However, in the color tone settings screen 202 for color images, the user is able to select the gamma value from three different candidate values (1.5,1.8, and 2.2) using the gamma value specifying part. These are stored in the candidate gamma value storage portion 102 (shown in FIG. 1). On the other hand, the dark tone adjustment scale 236 and the bright tone adjustment scale 238 are not displayed, so the color tones of the pixels in the dark area and in the light area cannot be adjusted (see FIG. 2 and FIG. 4).

Typical users print, without modification, color images produced by digital still cameras or taken from web pages, rather than performing monochrome printing. Moreover, typical users do not like complex operations. These users can be given the ability to print color images using simple operations, without a feeling of complexity, through, as described above, not having the users make the difficult decisions required in adjusting the color tones in the dark areas and the light areas, by not displaying, in the color image color tone settings screen 202, the dark tone adjustment scale 236 and the bright tone adjustment scale 238.

On the other hand, those who print black-and-white images are users who desire fine adjustments in image quality, such as silver halide photography enthusiasts in the past. In the first embodiment, the dark tone adjustment scale 236 and the bright tone adjustment scale 238 are displayed in the monochrome image color tone settings screen 200, enabling the adjustments of the color tones in the dark area and the bright area. By doing so, the printer driver in the first embodiment enables the user who prints black-and-white images to perform fine adjustments of the image quality of the black and white images.

The reference printing three-dimensional lookup table 104b (shown in FIG. 1), is a lookup table that is used when the user prints an image with image data, using the default color tone. In contrast, the printing three-dimensional lookup table 104a is a lookup table that is used when the user changes the color tones of the image for the image data and then prints. The printing three-dimensional lookup table 104a is generated from the reference printing three-dimensional lookup table 104b.

Figure 8:
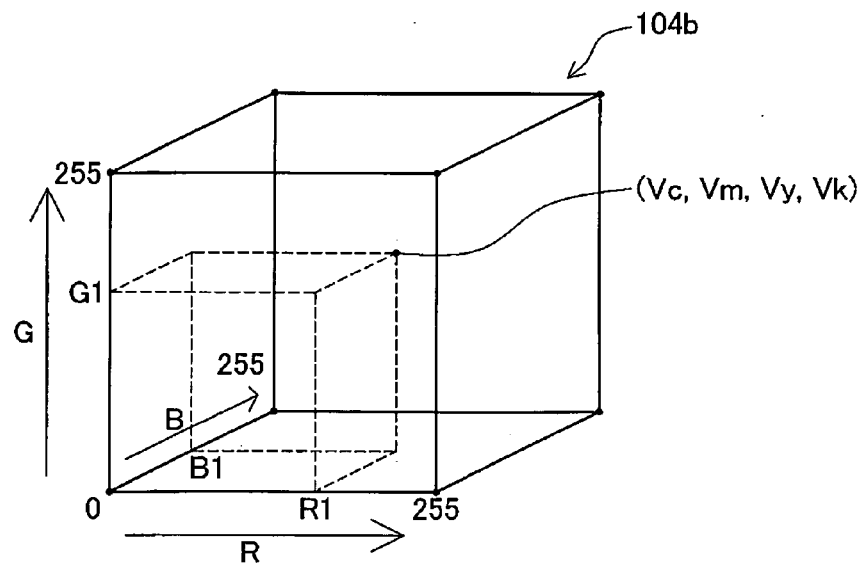
FIG. 8 is a diagram illustrating a reference printing three-dimensional lookup table 104*b*.

FIG. 8 is a figure showing a reference printing three-dimensional lookup table 104b. The reference printing three-dimensional lookup table 104b is a table that stores combinations of the three red, green, and blue color tones (Vr, Vg and Vb) associated with combinations for the color tones of cyan, magenta, yellow and the first through third achromatic inks (Vc, Vm, Vy, Vk, V1k and V11k).

When the preliminary image data PID is color image data, that color image data is image data wherein the color of each pixel is expressed by combinations of the three tone values for red, green, and blue, which each assume values from 0 to 255. Consequently, the three input tone values Vr, Vg, and Vb, for red, green, and blue, in the reference printing three-dimensional lookup table 104b also are values from 0 to 255. Note that in the reference printing three-dimensional lookup table 104b, the tone values Vc, Vm, Vy, Vk, V1k and V11k for the output tone values for cyan, magenta, yellow, and the first through third achromatic inks, are also values from 0 to 255.

When the shape of the tone curve is determined by the gamma value specifying part, the brightness scale, and the contrast scale, the printing conversion table generating portion 98d in the color conversion module 98 (FIG. 1) generates the printing three-dimensional lookup table 104a, in the same manner wherein the printing one-dimensional lookup table 104c was generated from the reference printing one-dimensional lookup table 104d. In other words, the reference printing three-dimensional lookup table 104b is modified based on the shape of the tone curve to produce the printing three-dimensional lookup table 104a. Note that at this time the conversion operation must be performed for each red, green, and blue tone value separately.

The image converting portion 98e converts the color image data MID1 into the color image data MID2, wherein the color of each pixel is expressed by the six color tones for cyan, magenta, yellow and the first through third achromatic inks, following the printing three-dimensional lookup table 104a that was produced in this way.

Note that the output tone values in the reference printing one-dimensional lookup table 104d and the printing one-dimensional lookup table 104c assume values between 0 and 65,535, while, in contrast, in the reference printing three-dimensional lookup table 104b and the printing three-dimensional lookup table 104a, the tone values assume only the smaller 0 to 255. However, in color images saturation and hue are expressed in addition brightness. Consequently, this does not imply that in the results of printing the color images generated by the reference printing three-dimensional lookup table 104b or the printing three-dimensional lookup table 104a, there is a large reduction, relative to the results of printing black-and-white images in the ease with which the printed subject can be identified.

On the other hand, in the first embodiment, when a black-and-white image is printed, image data MID2 is outputted expressed in many more gradations that in the case of printing color images. The half-tone processing, performed thereafter, is also executed based on this high number of gradations. Because of this, the first embodiment enables the expression of fine brightness gradations in printing black-and-white images. Consequently, this fulfills the expectations of the conventional silver halide photography enthusiasts wishing to print in black-and-white. Moreover, in black-and-white images, which do not have saturation and hue, the printing is performed so as to make the printed subjects in the light parts and the printed subjects in the dark parts easily recognizable.

In this way, the printing system in the first embodiment is able to provide a suitable printing environment to both those users who print color images and those users who print black-and-white images, according to their respective preferences. Moreover, because the modifications of the image data are achieved through modifying the lookup tables, processing can be done quickly even when processing large amount of image data. In other words, there is not a great increase in required processing time even when the amount of image data is large.

B. Second Embodiment

In some cases, printing is performed by adding a specific color tone, such as sepia to a black-and-white image. This type of case is explained in the second embodiment. In the second embodiment, the method of producing the one-dimensional lookup tables is different from that in the first embodiment. Otherwise, the second embodiment is the same as the first embodiment.

The color circle in the color tone settings screen 200 (shown in FIG. 2) is the a*b* plane where L* is 55 in the L*a*b* color coordinate system, and is a part that is included in a circle with a radius of 20 with the center point thereof being a*=b*=0. In other words, the color circle 210 is a circular pallet that has a gray point in the center, and where a*, b* or both change stepwise depending on the position within the color circle 210. The user is able to specify the color to add to the black-and-white image by specifying one point within the color circle 210 using a mouse 130.

Moreover, the user is able to select, from among settings that have been prepared in advance, parameter settings for defining the color tone to be added to the image through a color tone selecting part 250 (shown in FIG. 2). Those parameter settings that have been prepared in advance can be, for example, a cool tone that is a color tone with the feeling of a cool color, a warm tone, which is a color tone with a feeling of a warm color, a sepia tone which has the look of a photograph that has faded, or the like.

Figure 9:
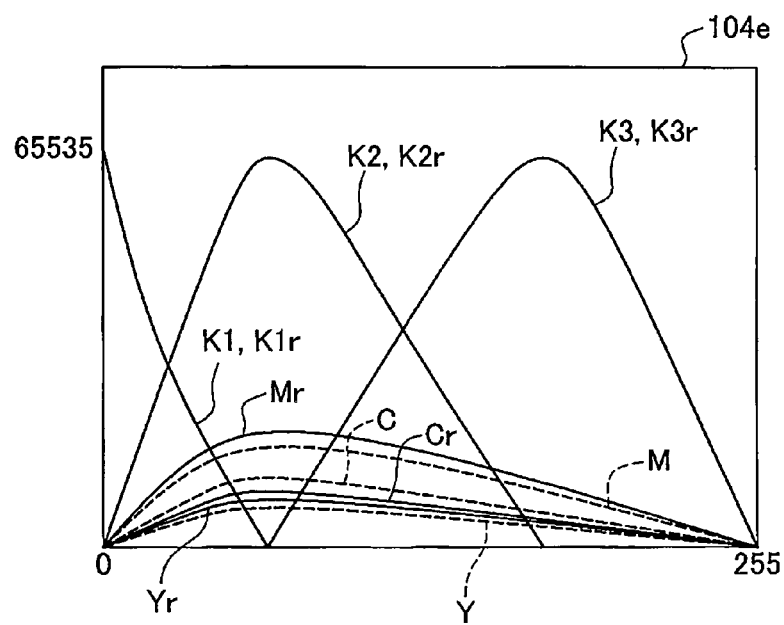
FIG. 9 is an explanatory diagram illustrating a method of generating a printing one-dimensional lookup table 104*e* in a second embodiment.

FIG. 9 is an explanatory diagram illustrating a for-tone-adjustment one-dimensional lookup table 104e and a reference printing one-dimensional lookup table 104d wherein the color tones have been modified through the use of a parameter specified by the color circle 210 in the second embodiment. In FIG. 9, the tone values for each of the ink colors in the reference printing one-dimensional lookup table 104d is indicated by the graphs for C, M, Y, K1, K2, and K3 with the dotted lines. The tone values for each of the inks in the for-tone-adjustment one-dimensional lookup table 104e are indicated by the graphs Cr, Mr, Yr, K1r, K2r and K3r with the solid lines. Note that when generating the for-tone-adjustment one-dimensional lookup table 104e, the graphs for the first through third achromatic inks are not changed. Thus the graphs for K1 and K1r, the graphs for K2 and K2r, and the graphs for K3 and K3r are superimposed.

When the color tone to be added to the black-and-white image is specified by the user through the color circle 210 or the color tone selecting part 250, then the for-tone-adjustment one-dimensional lookup table 104e is generated. Specifically, depending on the color tone specified by the user, data for the output tone values of the cyan (C), magenta (M), and yellow (Y) is generated and corrections are added to the output tone values for the cyan (C), magenta (M), and yellow (Y) in the printing reference one-dimensional lookup table 104d, to generate the four-tone-adjustment one-dimensional lookup table 104e. For example, when the color tone to be added is a sepia tone, then, as shown in FIG. 9, the cyan color tone value as a whole is reduced and the magenta and yellow color tone values are increased. The output tone values for each of these colors are values between 0 and 65,535, the same as for the printing one-dimensional lookup table 104c in the first embodiment.

Following this, the aforementioned for-tone-adjustment one-dimensional lookup table 104e is converted again based on the tone curve Gd (shown in FIG. 4A) that was determined using the color tone settings screen 200, to thus produce the printing one-dimensional lookup table 104c (See FIG. 6). The conversion is done in the same manner as that which was done in producing the printing one-dimensional lookup table 104c from the reference printing one-dimensional lookup table 104d in the first embodiment.

The above makes it possible to perform fine adjustments in color even when printing black-and-white photographs to which a specific color, such as a cool tone that is a color tone with the feeling of a cool color, a warm tone, which is a color tone with the feeling of a warm color, a sepia tone which has color that resembles a faded photograph, or the like, has been added.

Note that in this specification, "monochrome image data" may be either image that that has data for brightness only in each pixel from which the image is formed, or an image that has a specific color tone, such as a cool tone, a warm tone, or a sepia tone (added thereto). That is, monochrome image data may be image data wherein the color of each pixel is expressed in terms of a single system of tone values wherein multiple colors with mutually differing brightnesses are combined together. The printing process for monochrome images in the first and second examples of embodiment correspond to both the case of printing by generating the black-and-white image data MID2, with only brightness information for each pixel, from the preliminary image data PID, and to the case of printing by generating the data MID2 wherein the color of each pixel is expressed by a single system of tone values, as described above.

C. Third Embodiment

Figure 10:
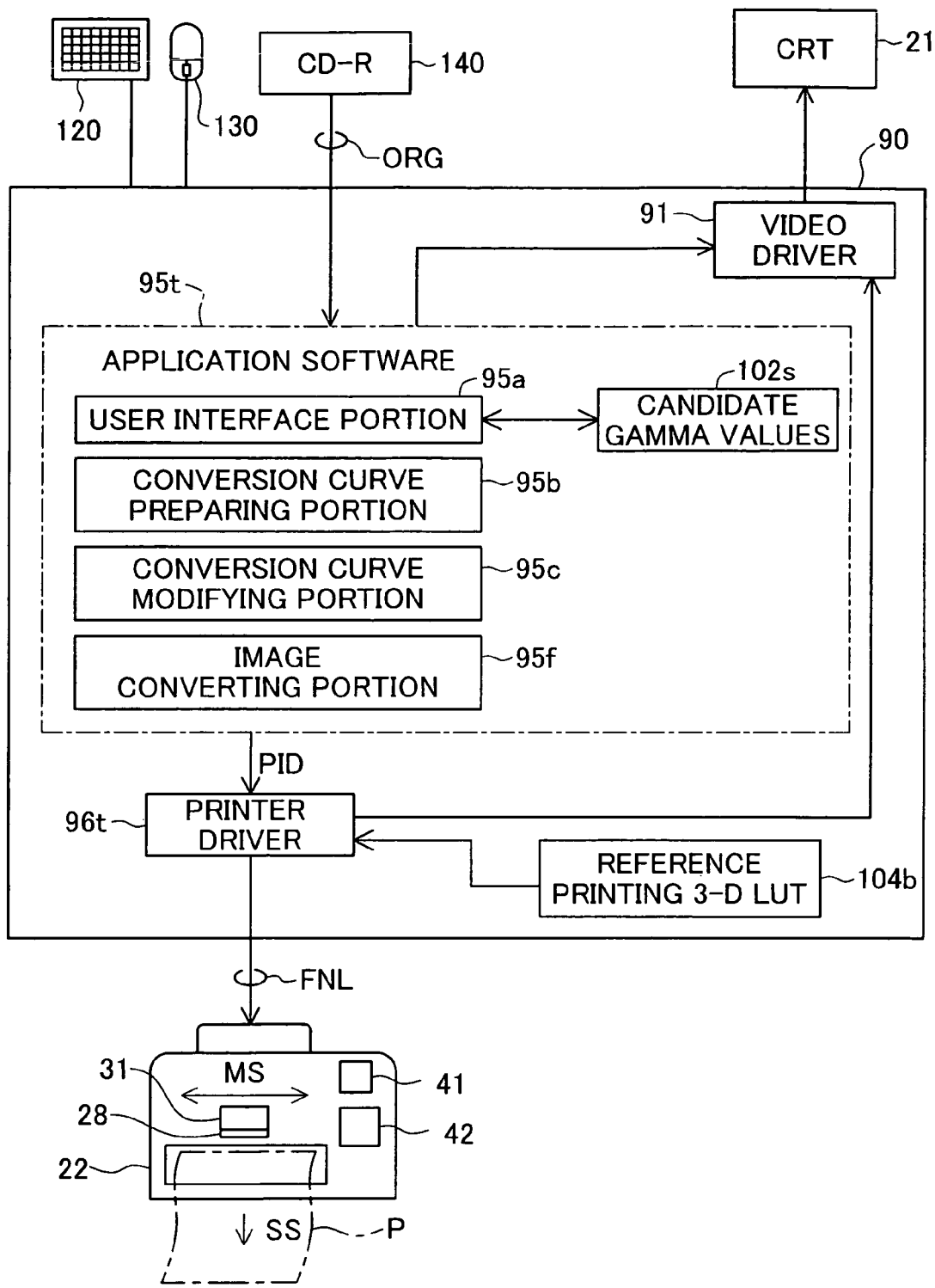
FIG. 10 is a block diagram illustrating the structure of software in a printing system in a third embodiment.

FIG. 10 is a block diagram illustrating the structure of software for a printing system according to a third embodiment. In the first embodiment, the tone adjustments of the image data were achieved through the printer driver 96 generating printing lookup tables 104c and 104a according to tone curves. However, in the third embodiment, application software 95t converts the colors in the image data by modifying the tone values of the pixels in the original image data ORG. In the third embodiment, the printer driver 96t is provided with only a reference printing three-dimensional lookup table 104b as the color conversion table 104. Moreover, the printer driver 96t converts the preliminary image data PID, received from the application software 95t, into the print image data FNL while maintaining the color tones as they are. The other aspects of the third embodiment are identical to those in the first embodiment.

In the third embodiment, the application software 95t comprises a user interface portion 95a, a conversion curve preparing portion 95b, a conversion curve modifying portion 95c, and an image converting portion 95f. The user interface portion 95a, the conversion curve preparing portion 95b and conversion curve modifying portion 95c achieve similar functions to the user interface portion 98a, the conversion curve preparing portion 98b, and the conversion curve modifying portion 98c, respectively, in the first embodiment. The image converting portion 95f converts the tone values of each of the pixels in the original image data ORG according to the tone curve Gd determined by the user. The application software 95t outputs the post-conversion image data, as the preliminary image data PID, to the printer driver 96t. The printer driver 96t references the reference printing three-dimensional lookup table 104b and converts the preliminary image data PID, received from the application software 95t, into the print image data FNL, while maintaining the color tones as they are.

A configuration such as in the third embodiment does not require the production of a lookup table when printing. Because of this, the user is able to start printing soon after instructing the application software 95t to print the image.

D. Variations

Note that the present invention is not limited to the examples of embodiment and forms of embodiment described above, but rather can be embodied in a variety of forms without deviating from the intent thereof, and can, for example, be modified as described below.

D1. Variation 1

Figure 11:
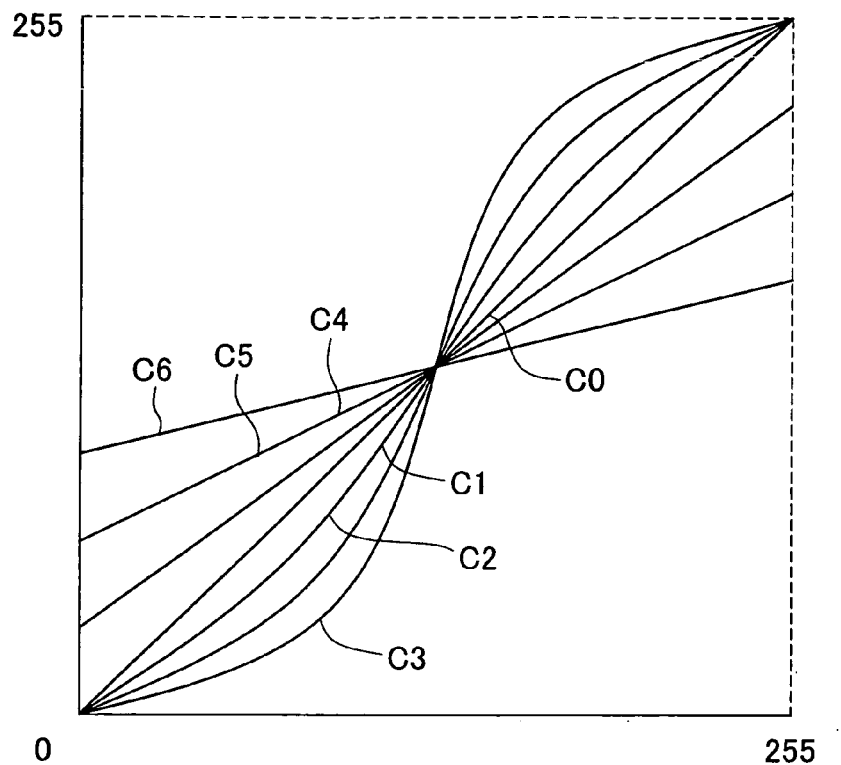
FIG. 11 is a diagram illustrating a tone curve for converting the contrast according to a parameter.

FIG. 11 is a diagram showing a tone curve for contrast conversion conforming to a parameter. In the first embodiment, more candidates for gamma value were prepared for printing black-and-white images than for printing color images, and one of multiple tone curves could be selected depending on the gamma value. However, the tone curves that are prepared in advance may be tone curves that express other conversions rather than expressing only gamma conversions. For example, as shown in FIG. 11, the tone curves C1 to C6 for contrast conversions may be prepared, and parameters can be associated with each curve. Moreover, more selections may be provided for the tone curves (parameters) when printing black-and-white images than when printing color images. Note that in FIG. 11 the tone curves C0 and C4 to C6 are straight lines. Additionally, the tone curve C0 is the tone curve for the case wherein no change is made to the contrast.

Note that each of the parameters and tone curves may be applicable to both black-and-white images and to color images. Additionally, the tone values conversion expressed by the tone curve should be a tone value conversion of tone values from a specific tone value system (comprising tone values that have mutually differing brightnesses) into the same tone values, or into different tone values, within the same tone value system. For example, in tone value conversion any of the tone values ranging from 0 to 255 for monochrome tone values of a sepia color tone can be converted into other tone values that are monochrome tone values of the same sepia tone, tone value conversion that changes only tone values 208 through 255, of the full range of monochrome tone values from 0 to 255, can be performed. The same is true for monochrome tone values of a cool color tone, warm color tone, or colorless (gray) tone. Furthermore, the parameters are not limited to numbers, but may use alphabetic characters or other characters or symbols. In other words, any indicator may be used insofar as there are codes for mutually differing color conversions.

D2. Variation 2

In the first embodiment a highlight point checkbox 240 for adjusting the brightness of the brightest color in the image data was provided in the color tone settings screen 200. However, the means for adjusting the brightness of the brightest colors in the image data may instead be a scale, the same as, for example, the brightness scale 232. For example, a scale that can be moved from the right end toward the left may be displayed in the color tone settings screen where the further to the left causes the brightness of the color that is the brightest within the image data to become darker.

Note that the tone value for the color that is the brightest in the image data was put to 240 in the first embodiment through the placement of a check in the highlight point checkbox 240, but the tone value of the brightest color may be a different value instead. In other words, the tone value of the color that is the brightest, set through this adjustment, may be placed to any given value that is smaller than the maximum value in the output tone values.

D3. Variation 3

Figure 12:
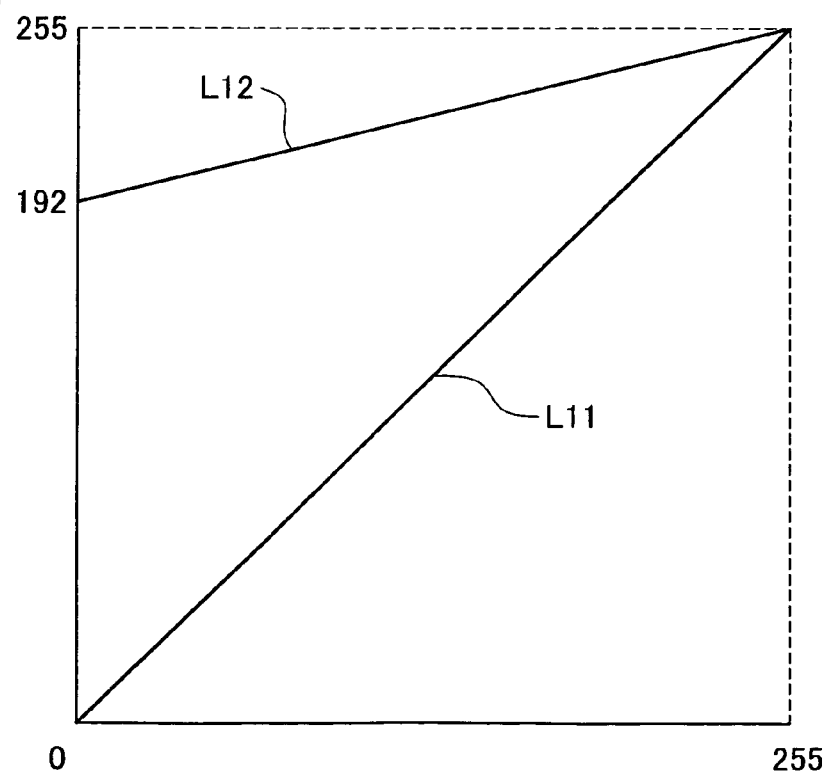
FIG. 12 is diagram illustrating a tone curve when adjusting the brightness of the darkest colors in the image data.

FIG. 12 is a figure illustrating a tone curve when the brightness of the darkest color in the image data has been adjusted. A shadow point check box for adjusting the brightness of the color that is the darkest in the image data may be provided in the color tone settings screen. The tone value of the color that is the darkest in the image data can be increased to a larger value, such as 80 or 192, by placing a check in this checkbox. This configuration makes it possible to obtain an image that is brighter overall, and is well suited for use in, for example, the background of posters.

Note that the means for adjusting the brightness of the darkest colors in the image data may be a scale instead of a checkbox, the same as the means for adjusting the brightness of the color that is the brightest. Moreover, the tone value of the color that is the darkest may be set to any given value that is larger than the minimum value of the output tone values.

Furthermore, the tone value of the color that is the darkest in the image data may be determined according to the type of print medium. For example, for a glossy paper wherein the surface is smooth, this value may be set to a relatively low value, whereas for a mat paper with a surface that is rough, this value should be set to a higher value. For a mat paper, the reproduction of extremely dark colors, in the vicinity of a tone value of 0, is difficult when compared to doing so with a glossy paper. Similarly, the tone value of the color that is the brightest in the image data may be determined according to the type of print medium. Note that the type of print medium may be inputted by the user through a user interface screen in the printer driver 96, or the printer may detect the type of print medium automatically and send information regarding the type of print medium to the printer driver 96.

Note that "type of print medium" can refer to a type that is determined depending on the brightness of an area wherein no ink has been applied and the brightness of an area saturated with ink of one color. In this case, an area wherein no ink has been applied, and an area wherein the ink has been applied to saturation are measured with a colorimeter for two different types of print media, and if the "L' in the L*a*b* color coordinate system is different by more than 10%, then "the type of print medium is different."

D4. Variation 4

In the first embodiment, the reference printing one-dimensional lookup table 104d (shown in FIG. 1) may be configured such that the tone characteristics may include a part wherein, when the color is expressed in the L*a*b* color coordinate system, the value L* of the color increases linearly with an increase in the input tone values that express the color in the dark area As of low tone values. This type of tone characteristic makes it easier to recognize objects that are recorded in the image, in colors in the dark area As. Moreover, this type of characteristic may be set to be the default tone characteristic in the dark area, and the user should be enabled to modify this using the dark tone adjustment scale 236.

Moreover, the part tone curves specified by the user were quadratic curves. However, the part tone curves specified by the user are not limited thereto, but may, instead, be other curves, for example, the curve may be a cubic curve, or a quartic curve, a spline curve, or a Bezier curve may be used. However, when a cubic curve is used or a quartic curve, or the like, is used as the part tone curve defined by the user, a plurality points should be specified as the points through which the curves pass.

Moreover in a part of the part tone curve Gs, for example, in a contact area Asc (see FIG. 4B) that is in a ¼ from the top in the dark area As wherein the tone values are from 0 to 32, the tone curve may preferably be formed so that there is no major change from the original part tone curve. Specifically, the shape of the tone curve in the contact area Asc is determined as follows. The values of the output tone values, relative to each of the input tone values, are determined so as to be a weighted average between the output tone values determined by the original tone curve, and output tone values determined by a curve such as a quadratic curve or a spline curve specified by the user. In the upper limit of the contact area Asc (at the input tone value 32), the weighting of the original tone curve is 100%. At the lower limit of the contact area Asc (with the input tone value 24), the weighting of the specified curve is 100%. The weighting changes as the input tone value moves from lower to higher, increasing the weighting on the original tone curve.

Similarly, in a contact area Ahc (see FIG. 4C) in the bottom ¼ of the bright area Ah, the shape of the curve may preferably be determined so that there is no large change in shape in the original part tone curve. The shape of the curve may be determined through the use of a weighted average between the original curve and a curve specified provisionally by a user specification (a quadratic curve, a spline curve, or the like).

Furthermore, instead of the method shown in the first embodiment, a method that is the same as the method shown above can be used also for determining the shape of the tone curve L21 (shown in FIG. 5) when adjusting the brightness of the color that is the brightest. That is to say, the shape of the tone curve L21 can be determined so that the output tone values for each of the input tone values will be a weighted average between the output tone value determined by the tone curve L22 and the output tone value determined by the line L23. At the lower limit of the transition area At (the input tone value 160), the weighting of the tone curve L22 is 100%. At the upper limit of the transition area At (the input tone value 255), the weighting of the line L23 is 100%. The weighting varies as the input tone value moves towards higher values so as to increase the weighting on the tone curve L22.

D5. Variation 5

In the first embodiment the dark area As wherein the shape of a portion of the tone curve was modified, was the area wherein the input tone values range from 0 to 32. However, the area wherein the shape of a part of the tone curve is modified can be set to a different range instead. For example, it may be between 0 and 64. However, preferably this area includes the range of the bottom 20% of the entire range of values that can be assumed by the input tone values, and, more preferably, is a range that includes the range of the bottom 12.5%.

Additionally, in the first embodiment the bright area Ah wherein the shape of a part of the tone curve was modified was the area wherein the input tone values were 192 to 255. However, the area wherein the shape of the part of the tone curve is modified may be a different range instead. For example, it may be 160 through 255. Moreover, the area wherein the shape of a part of the tone curve is modified may be a specific range that does not include the values on both ends (0 and 255 in the first embodiment), but including the value in the center of the range of values that can be assumed by the tone values (which is 126 in the first embodiment). Note that the area preferably includes the range of the top 40% of the range of values that can be assumed by the input tone values, and more preferably, is an area that includes the range of the top 25%.

D6. Variation 6

In the first embodiment, the modifications in the shape of the tone curves in the dark area As and in the bright area Ah were performed in such a way that the change in brightness in the point that had the greatest change in the output tone value was within a range of f10 (as shown in FIG. 4B and FIG. 4C). However, the change in shape in the tone curves may be performed in a greater range, or may be constrained to a narrower range. Moreover, the width of the change in shape of the tone curve may be determined depending on the print medium. For example, with paper wherein the changes in tone are, as a whole, large (that is, paper that is able to reproduce a broad range of tone values), then the width can be set to be relatively broad, whereas this setting should be narrower if the range of tones that can be reproduced is narrower.

D7. Variation 7

In the first embodiment, the user selected, from three candidate values, a gamma value to be the parameter corresponding to the tone curve when performing color printing. Moreover, when performing monochrome printing, the user selected a gamma value from six candidate values. However, the numbers of parameters for the selection are not limited thereto, but rather could be different numbers. That is, the number of parameters than can be selected when performing monochrome printing need only be larger than the number of parameters that can be selected when performing color printing. Note that the number of parameters that can be selected when performing monochrome printing may preferably be at least twice the number of parameters that can be selected when performing color printing.

D8. Variation 8

In the first embodiment and in the second embodiment the output tone values for the printing one-dimensional lookup table used in monochrome printing ranged from 0 to 65,535 (16 bits), and the output tone values in the printing three-dimensional lookup table used for color printing ranged from 0 to 255 (8 bits). However, the widths of the output tone values are not limited to these numbers, but rather can be set to different widths. However, the widths of the values that can be assumed by the output tone values of the lookup tables used in monochrome printing should be wider than the widths of the values that can be assumed by the output tone values of the lookup tables used in color printing.

D9. Variation 9

In the various examples of embodiment described above, three types of inks (C, M, and Y) were used as the chromatic inks; however, other colors may be used instead. For example, inks such as red, green, purple, or the like, or colored inks with different densities such as light cyan, light magenta, dark yellow, etc., may be used.

In the first embodiment and the second embodiment, the printing one-dimensional lookup table used in monochrome printing had output tone values for a color coordinate system comprising the first through third achromatic inks, cyan, magenta, and yellow. However, the printing one-dimensional lookup table used in monochrome printing may include output tone values for other ink colors that are used in the printer. Moreover, there may be an output tone value for only the black color alone.

D10. Variation 10

In the first embodiment and the second embodiment, the printing reference lookup table was modified depending on a conversion curve in color printing and in monochrome printing, to generate the printing lookup table. However, when allowed by the hardware processing capabilities used in the image conversion, the conversion curve may be used to convert the direct input image data.

D11. Variation 11

A portion of the structure that is achieved in hardware in the embodiments described above may be replaced by software, and, conversely, a portion of the structure achieved by software may be replaced by hardware. For example, a portion of the functions of the printer driver 96 (shown in FIG. 1) may be executed by the printer CPU 41 instead. Moreover, in the examples of embodiment described above, a portion of the structure provided by the driver may be transferred to the application software, or, conversely, a portion of the structure achieved in the application software may be transferred to the driver.

The computer program that achieves these types of functions may be provided in a form that is recorded on a recording medium that can be read by a computer, such as a floppy disk, a CD-ROM, or the like. The host computer reads the computer program from the recording medium and transfers the program to an internal memory device or an external memory device. Conversely, the computer program may be provided to the host computer from a program providing device through a communications circuit. When the functions of the computer program are actually produced, the computer program that is stored in the internal memory device is executed by the microprocessor of the host computer. Furthermore, the computer program that is stored on the recording medium may instead be executed directly by the host computer.

In this specification, the "computer" is a concept that includes a hardware device and an operation system, and refers to the hardware device that operates under the control of the operation system. The computer program produces the functions of the various parts, described above, on this type of computer. Note that a portion of the functions described above may be provided by the operation system rather than by the application program.

Note that in the present invention, the "computer readable medium" is not limited to a portable recording medium such as a flexible disk or a CD-ROM, but also includes internal recording devices within the computer such as any type of RAM or ROM, and includes external memory devices that are attached to the computer, such as hard disks, and the like.

Moreover, a computer program product can be actualized in a variety of forms. For example, there are forms such as described below:

(i) A computer readable recording medium, such as a flexible disk, an optical disk, a semiconductor memory, etc.;
(ii) A data signal, including the computer program, embedded within a carrier wave;
(iii) A computer that includes a computer-readable recording medium such as a magnetic disk or a semiconductor memory; and
(iv) A computer wherein a computer program is stored temporarily in memory through a data carrier wave.

The above explained in detail the invention according to the present application while referencing preferred illustrative examples of embodiment. However, the invention according to the present application is not limited to the examples of embodiment or structures described above. Moreover, the invention according to the present application includes a variety of modifications and equivalent structures. Furthermore, although the various elements of the disclosed invention were disclosed by a variety of combinations and structures, these are merely illustrative and the elements may be more or fewer. Moreover, there may be only a single element. These configurations are also included within the scope of the invention according to the present operation.

INDUSTRIAL APPLICABILITY

The present invention can be applied to a variety of application software and image processing devices for editing image data.

What is claimed is:

1. An image processing device for generating modified image data by modifying color tones of an image in image data; comprising
   a parameter candidate storage portion that stores a plurality of modification candidate parameters for modifying colors of pixels in image data, the plurality of modification candidate parameters corresponding to mutually differing modifications, and each of the plurality of modification candidate parameters corresponding to modification which converts tone values of a primary color in a color system into tone values of the same primary color, or modification which converts tone values of lightness into tone values of lightness where at least some of the tone values of lightness have different values;
   a user interface portion that allows a user to select parameters from among the plurality of modification candidate parameters; and
   an image converting portion that generates modified image data according to the selected parameters from subject image data that is subject for modification of color tones in image, wherein the modified image data is different from the subject image data in colors of at least part of pixels; wherein
   the plurality of modification candidate parameters includes:
      Nc color image modification candidate parameters for color image data, where Nc represents a number that is a positive integer, and
      Nm monochrome image modification candidate parameters for monochrome images, where Nm represents a number that is an integer larger than Nc; and
   the user interface portion
      allows the user to select a parameter from the Nc color image modification candidate parameters in case where the subject image data is color image data; and
      allows the user to select a parameter from the Nm monochrome image modification candidate parameters in case where the subject image data is monochrome image data.

2. An image processing device according to claim 1, further comprising:
   a conversion curve preparing portion that prepares according to the selected parameters a conversion curve for producing modification of colors of pixels, the conversion curve providing output tone values corresponding to input tone values,
   when the subject image data is monochrome image data, the user interface portion provides a partial adjustment input screen for modifying a second part of the conversion curve without modifying a first part of the conversion curve, the first part being a part in which the input tone values are within a specific range,
   the image processing device further comprises a conversion curve modifying portion that modifies the second part of the conversion curve according to user instructions through the partial adjustment input screen, and
   the image converting portion produces tone values for pixels of the modified image data by modifying tone values of pixels of the subject image data based on the conversion curve.

3. An image processing device according to claim 2, wherein the second part is a part corresponding to an area of the input tone values, the area being included in a range of up to top 40% of scope of the input tone values.

4. An image processing device according to claim 2, wherein the second part is a part corresponding to an area of the input tone values, the area being included in a range of up to bottom 25% of scope of the input tone values.

5. An image processing device according to claim 2, wherein the conversion curve modifying portion modifies the second part of the conversion curve so that a highest value in scope of the input tone values is converted into a lower value than a highest value in scope of the output tone values.

6. An image processing device according to claim 3 or 4 wherein the conversion curve modifying portion modifies the conversion curve so that change in the output tone values of the conversion curve is within a range of ±10 when expressed as the "L*" in an "L*a*b*" color coordinate system.

7. An image processing device according to claim 3 or 4 further comprising:
 a medium type input portion that receives information about a type of print medium for printing image of the subject image data; and
 a modification range determining portion that determines according to the information about the type of the print medium an allowable range of modifications of the output tone values of the conversion curve by the conversion curve modifying portion; wherein
 the conversion curve modifying portion modifies the conversion curve so that sizes of the changes in the output tone values of the conversion curve are within the allowable range.

8. An image processing device according to claim 2, wherein the conversion curve modifying portion modifies the second part of the conversion curve so that a lowest value of in scope of the input tone values is converted into a higher value than a lowest value in scope of the output tone values.

9. An image processing device according to claim 2, wherein
 the monochrome image data is image data in which brightness of each pixel is expressed by a tone value,
 the image processing device further comprises a conversion table generating portion that generates a monochrome image conversion table according to the conversion curve when the subject image data is monochrome image data;
 the monochrome image conversion table is a conversion table for converting the monochrome image data into image data expressed by tone values in a specific first color coordinate system, wherein conversion with the monochrome image conversion table converts at least a part of achromatic colors expressed by tone values into colors with different brightnesses; and
 the image converting portion converts the subject image data into the modified image data based on the monochrome image conversion table when the subject image data is monochrome image data.

10. An image processing device according to claim 9, wherein
 the color image data is image data in which color of each pixel is expressed by tone values in a second color coordinate system,
 the conversion table generating portion generates a color image conversion table according to the conversion curve when the subject image data is color image data;
 the color image conversion table is a conversion table for converting the color image data into image data expressed by tone values in a third color coordinate system that is different from the second color coordinate system, wherein conversion with the color image conversion table modifies at least part of colors expressed by the tone values in the second color coordinate system into other colors;
 the image converting portion converts the subject image data into the modified image data based on the color image conversion table when the subject image data is color image data;
 the third color coordinate system is a color coordinate system in which tone values can be any of Mc mutually differing values, where Mc represents a number that is a positive integer; and
 the first color coordinate system is a color coordinate system in which tone value can be any of Mm mutually differing values, where Mm represents a number that is an integer larger than Mc.

11. An image processing device according to claim 9, wherein the monochrome image conversion table is a conversion table that includes a part in which, when colors are expressed in an "L*a*b*" color coordinate system, the "L*" value of a color that is modified according to the conversion curve is incremented linearly relative to increments in the input tone values that expresses color prior to modification.

12. A method for generating modified image data by modifying color tones of an image in image data comprising steps of:
 (a) selecting a parameter from a plurality of modification candidate parameters for modifying colors of pixels in image data, the plurality of modification candidate parameters corresponding to mutually differing modifications, and each of the plurality of modification candidate parameters corresponding to modification which converts tone values of a primary color in a color system into tone values of the same primary color, or modification which converts tone values of lightness into tone values of lightness where at least some of the tone values of lightness have different values; and
 (b) generating modified image data according to the selected parameter from subject image data that is a subject for modifications of color tones in image, wherein the modified image data is different from the subject image data in colors of at least part of pixels, wherein,
 the plurality of modification candidate parameters includes:
  Nc color image modification candidate parameters for color image data, where Nc represents a number that is a positive integer; and
  Nm monochrome image modification candidate parameters for monochrome images, where Nm represents a number that is an integer larger than Nc;
 the step (a) includes:
 (a1) selecting the parameter from the Nc color image modification candidate parameters in case where the subject image data is color image data; and
 (a2) selecting the parameter from the Nm monochrome image modification candidate parameters when the subject image data is monochrome image data; and
 each step of the method for generating modified image data by modifying color tones of an image in image data is executed by a microprocessor.

13. A method according to claim 12, further comprising:
 (c) preparing according to the selected parameter a conversion curve for producing modification of colors of pixels, the conversion curve providing output tone values corresponding to input tone values,
 the step (a) further includes
 providing to a user a partial adjustment input screen for modifying a second part of the conversion curve without modifying a first part of the conversion curve, when the subject image data is monochrome image data, the first part being a part in which the input tone values are within a specific range, the method further comprising (d) modifying the second part of the conversion curve according to user instructions through the partial adjustment input screen, and the step (b) includes producing tone values for pixels of the modified image data by modifying tone values of pixels of the subject image data based on the conversion curve.

14. A method according to claim 13, wherein the step (d) includes modifying the second part of the conversion curve so that a highest value in scope of the input tone values is converted into a lower value than a highest value in scope of the output tone values.

15. A method according to claim 13, wherein the step (d) includes modifying the second part of the conversion curve so that a lowest value of in scope of the input tone values is converted into a higher value than a lowest value in scope of the output tone values.

16. A non-transitory computer program product for generating modified image data using a computer by modifying color tones of an image in image data comprising:

a non-transitory computer-readable storage medium; and a computer program that is stored on the computer-readable storage medium, wherein the computer program causes a computer to perform:

a function for allowing a user to select a parameter from a plurality of modification candidate parameters for modifying colors of pixels in image data, the plurality of modification candidate parameters corresponding to mutually differing modifications, and each of the plurality of modification candidate parameters corresponding to modification which converts tone values of a primary color in a color system into tone values of the same primary color, or modification which converts tone values of lightness into tone values of lightness where at least some of the tone values of lightness have different values; and a function for generating modified image data according to the selected parameter from subject image data that is a subject for modifications of color tones in image, wherein the modified image data is different from the subject image data in colors of at least part of pixels, wherein the plurality of modification candidate parameters includes:

Nc color image modification candidate parameters for color image data, where Nc represents a number that is a positive integer, and Nm monochrome image modification candidate parameters for monochrome images, where Nm represents a number that is an integer larger than Nc; and on the computer, the computer program further performs functions of:

allowing the user to select the parameter from the Nc color image modification candidate parameters in case where the subject image data is color image data; and allowing the user to select the parameter from the Nm monochrome image modification candidate parameters in case where the subject image data is monochrome image data.

17. A computer program product according to claim 16, wherein the computer program further performs preparing according to the selected parameter a conversion curve for producing modification of colors of pixels on the computer, the conversion curve providing output tone values corresponding to input tone values, the function for allowing the user to select a parameter includes a function for providing to the user a partial adjustment input screen for modifying a second part of the conversion curve without modifying a first part of the conversion curve, when the subject image data is monochrome image data, the first part being a part in which the input tone values are within a specific range, on the computer, the computer program further performs a function for modifying the second part of the conversion curve according to user instructions through the partial adjustment input screen, and the function for generating modified image data includes a function for producing tone values for pixels of the modified image data by modifying tone values of pixels of the subject image data based on the conversion curve.

18. A computer program product according to claim 17, wherein the function for modifying the second part includes a function for modifying the second part of the conversion curve so that a highest value in scope of the input tone values is converted into a lower value than a highest value in scope of the output tone values.

19. A computer program product according to claim 17, wherein the function for modifying the second part includes a function for modifying the second part of the conversion curve so that a lowest value of in scope of the input tone values is converted into a higher value than a lowest value in scope of the output tone values.

* * * * *